(12) United States Patent
Simonsen et al.

(10) Patent No.: US 8,960,415 B2
(45) Date of Patent: Feb. 24, 2015

(54) MASTER PROCESSING APPARATUS WITH ADJUSTABLY SPACED PRESSURE ROLLERS

(75) Inventors: Deborah Lynn Simonsen, Mesa, AZ (US); Thomas Murdoch, Scottsdale, AZ (US); Chakrayud Piboontum, Phoenix, AZ (US)

(73) Assignee: Xyron, Inc., Scottsdale, AZ (US)

( * ) Notice: Subject to any disclaimer, the term of this patent is extended or adjusted under 35 U.S.C. 154(b) by 537 days.

(21) Appl. No.: 13/158,216

(22) Filed: Jun. 10, 2011

(65) Prior Publication Data

US 2011/0303513 A1    Dec. 15, 2011

Related U.S. Application Data

(60) Provisional application No. 61/355,109, filed on Jun. 15, 2010.

(51) Int. Cl.
| | | |
|---|---|---|
| *B65G 13/12* | (2006.01) | |
| *B32B 37/10* | (2006.01) | |
| *B32B 37/00* | (2006.01) | |
| *B65G 13/06* | (2006.01) | |

(52) U.S. Cl.
CPC ........... *B32B 37/1054* (2013.01); *B65G 13/065* (2013.01); *B32B 37/0053* (2013.01); *B32B 2037/0061* (2013.01)
USPC .......................................... 198/782; 198/624

(58) Field of Classification Search
USPC .................. 198/624, 782; 100/168, 169, 171; 271/274; 74/397
See application file for complete search history.

(56) References Cited

U.S. PATENT DOCUMENTS

| | | | | |
|---|---|---|---|---|
| 2,693,273 | A | * | 11/1954 | Kopplin .......................... 226/177 |
| 3,246,822 | A | * | 4/1966 | Skeen ............................. 226/155 |
| 4,346,883 | A | * | 8/1982 | Speraggi ......................... 271/274 |
| 4,607,835 | A | * | 8/1986 | Wilson et al. .................. 271/227 |
| 4,676,862 | A | | 6/1987 | Kuehnert |

(Continued)

FOREIGN PATENT DOCUMENTS

| | | |
|---|---|---|
| CN | 1518517 | 8/2004 |
| CN | 101448642 | 6/2009 |

(Continued)

OTHER PUBLICATIONS

European Search Report of European Appl. No. 11169815.5 dated Sep. 30, 2011 (7 pgs).

(Continued)

*Primary Examiner* — William R Harp
(74) *Attorney, Agent, or Firm* — Pillsbury Winthrop Shaw Pittman, LLP

(57) ABSTRACT

A master processing apparatus is disclosed. The master processing apparatus has first and second pressure applying rollers, and a plurality of gears configured to drive the rollers in response to received input torque. The master processing apparatus further has a pivot plate, connected to the first pressure applying roller and the plurality of gears, allowing a range of movement for the first pressure applying roller, while the plurality of gears may remain intermeshed. The master processing apparatus further has a torsion spring about the pivot plate gear axis, configured to bias the pivot plate and first pressure applying roller towards the second pressure applying roller. Other objects, features, and advantages are also disclosed.

54 Claims, 12 Drawing Sheets

(56) References Cited

U.S. PATENT DOCUMENTS

| | | | |
|---|---|---|---|
| 4,775,140 A * | 10/1988 | Foster | 271/121 |
| 4,905,053 A * | 2/1990 | Matsuo et al. | 399/402 |
| 4,915,284 A * | 4/1990 | Goda | 226/177 |
| 5,580,417 A | 12/1996 | Bradshaw | |
| 5,584,962 A | 12/1996 | Bradshaw et al. | |
| 6,698,487 B2 * | 3/2004 | Lemens et al. | 156/494 |
| 6,742,428 B2 * | 6/2004 | Lemens et al. | 83/353 |
| 7,104,304 B2 * | 9/2006 | Ensign et al. | 156/555 |
| 7,234,369 B2 * | 6/2007 | Bartosch | 74/397 |
| 7,261,790 B2 | 8/2007 | Hoffman et al. | |
| 7,610,665 B2 | 11/2009 | Casaldi | |
| 2002/0074090 A1 | 6/2002 | Osumi et al. | |
| 2005/0247405 A1 | 11/2005 | Murphy et al. | |

FOREIGN PATENT DOCUMENTS

| | | |
|---|---|---|
| CN | 201317146 | 9/2009 |
| CN | 201483854 | 5/2010 |
| EP | 0170002 | 2/1986 |
| KR | 10-0942162 | 2/2010 |

OTHER PUBLICATIONS

Chinese Office Action dated Oct. 24, 2014 for Appln. No. 201110218557.9.

* cited by examiner

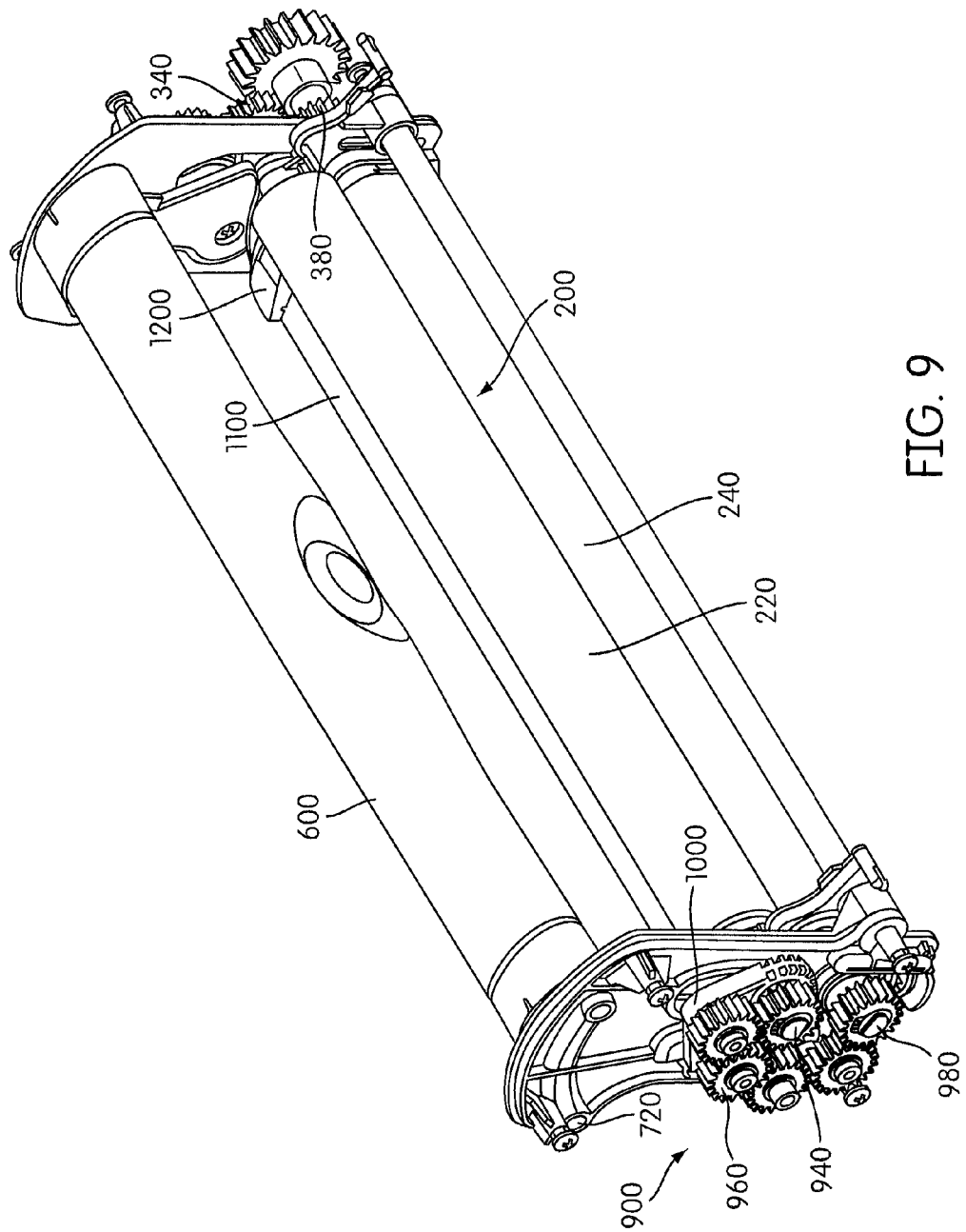

MASTER PROCESSING APPARATUS WITH ADJUSTABLY SPACED PRESSURE ROLLERS

This application claims priority to U.S. Provisional Application Ser. No. 61/355,109, filed Jun. 15, 2010, and entitled "Master Processing Apparatus with Adjustably Spaced Pressure Rollers."

FIELD OF THE INVENTION

The present invention relates generally to master processing apparatuses. More particularly, the present invention relates to master processing apparatuses with adjustable spacing between pressure applying rollers.

BACKGROUND OF THE INVENTION

Master processing apparatuses perform a master processing operation, such as laminating, adhesive transfer, magnet making, and other such operations, on a master (such as a photograph, printout, business card, or any other selected substrate or document). Each master processing apparatus includes a master processing assembly and a pair of feed rolls which hold the supply of stock materials. "Feed roll" is a generic name which may refer to a roll of a film (such as a clear laminating material), a roll of masters or a roll of backing material that carries an adhesive. "Stock material" is a generic name for the sheet of material that is wound around the roll. The feed rolls are often mounted in a cartridge which is itself mounted on the frame. A master processing assembly is provided in the frame and the stock materials on the feed rolls are unwound and fed into the master processing assembly. An actuator may be included in the apparatus to operate the master processing assembly. For example, a power-operated or, alternatively, a hand-operated actuator may be included in the apparatus to actuate the master processing assembly. A master to be processed is fed into the master processing assembly and the master processing assembly causes, for example, adhesive from one or both the stock materials to adhere to the master.

In laminating operations, for example, both stock materials are laminating films that are coated with pressure-sensitive or heat-sensitive adhesive and these films are applied to opposing sides of the master and adhere to the master or to each other (if the films are larger than the master). In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e. has an affinity for adhesive bonding), then any excess adhesive will transfer to the mask substrate, which is then peeled off to expose the master on the release liner and remove the excess adhesive. For further details on these operations, reference may be made to U.S. Pat. Nos. 7,610,665, 7,261,790, 5,580,417 and 5,584,962, each of which is incorporated herein by reference in its entirety.

In some master processing apparatuses, for example those wherein the adhesive is pressure sensitive, the master processing operation may comprise applying pressure to the adhesive and the master. This pressure may be applied through the use of a pair of pressure applying rollers. In embodiments of master processing apparatuses, it may be desirable to have an adjustable spacing between the pair of pressure applying rollers, so that masters of varying thickness may be processed in the master processing operation. It may also be desirable for the pressure to be generally constant throughout the master processing operation, which may, for example, ensure uniformity in the adhesive transfer to the master. The ability to open a spacing between the pair of pressure applying rollers so that a master can be placed and arranged therein prior to the start of the master processing operation may also be beneficial to those in operating the master processing apparatus. At other times, the application of a greater amount of pressure may also be useful, for example, to ensure proper transfer of pressure sensitive adhesive, or to apply pressure from both sides of a two-sided master.

The present application endeavors to provide an improved architecture for a master processing assembly that addresses these and other desires.

SUMMARY OF THE INVENTION

One aspect of the present invention relates to a master processing apparatus with a first pressure applying roller, and a second pressure applying roller. The first and second pressure applying rollers are rotatable about parallel roller axes. The master processing apparatus also contains a plurality of gears rotatable about respective gear axes parallel to the roller axes, including an input gear for receiving input torque, a first roller gear coaxial with and connected to the first pressure applying roller, and a pivot plate gear for transferring input torque from the input gear to the first roller gear. The apparatus further contains a pivot plate mounted for pivotal movement about the axis of the pivot plate gear.

In the master processing apparatus, the first roller gear and the first pressure applying roller may be connected to the pivot plate with their axes spaced radially from the axis of the pivot plate gear, allowing a range of movement for the first pressure applying roller for adjusting a spacing between the first and second pressure applying rollers. Throughout this range of movement of the first pressure applying roller, the plurality of gears in the master processing apparatus are configured to remain intermeshed. A torsion spring about the pivot plate gear axis biases the pivot plate and first pressure applying roller towards the second pressure applying roller The pressure applying rollers and gear train described may be affixed directly in the frame of the master processing apparatus, or may be contained within any other housing, such as a cartridge. In some embodiments the cartridge may be designed to insert into and be removable from the frame of the master processing apparatus, so that other cartridges, which may perform different processes on a master, may be swapped into the frame of the master processing apparatus depending on the process desired.

Other objects, features, and advantages of the present application will become apparent from the following detailed description, the accompanying drawings, and the appended claims.

BRIEF DESCRIPTION OF THE DRAWINGS

Features of the invention are shown in the drawings, in which like reference numerals designate like elements. The drawings form part of this original disclosure in which:

FIG. 9 is a top perspective view of the other side of the embodiment of FIG. 2A, showing the duplication of the plurality of gears in this embodiment.

DETAILED DESCRIPTION OF THE
ILLUSTRATED EMBODIMENT(S)

Figure 1A:
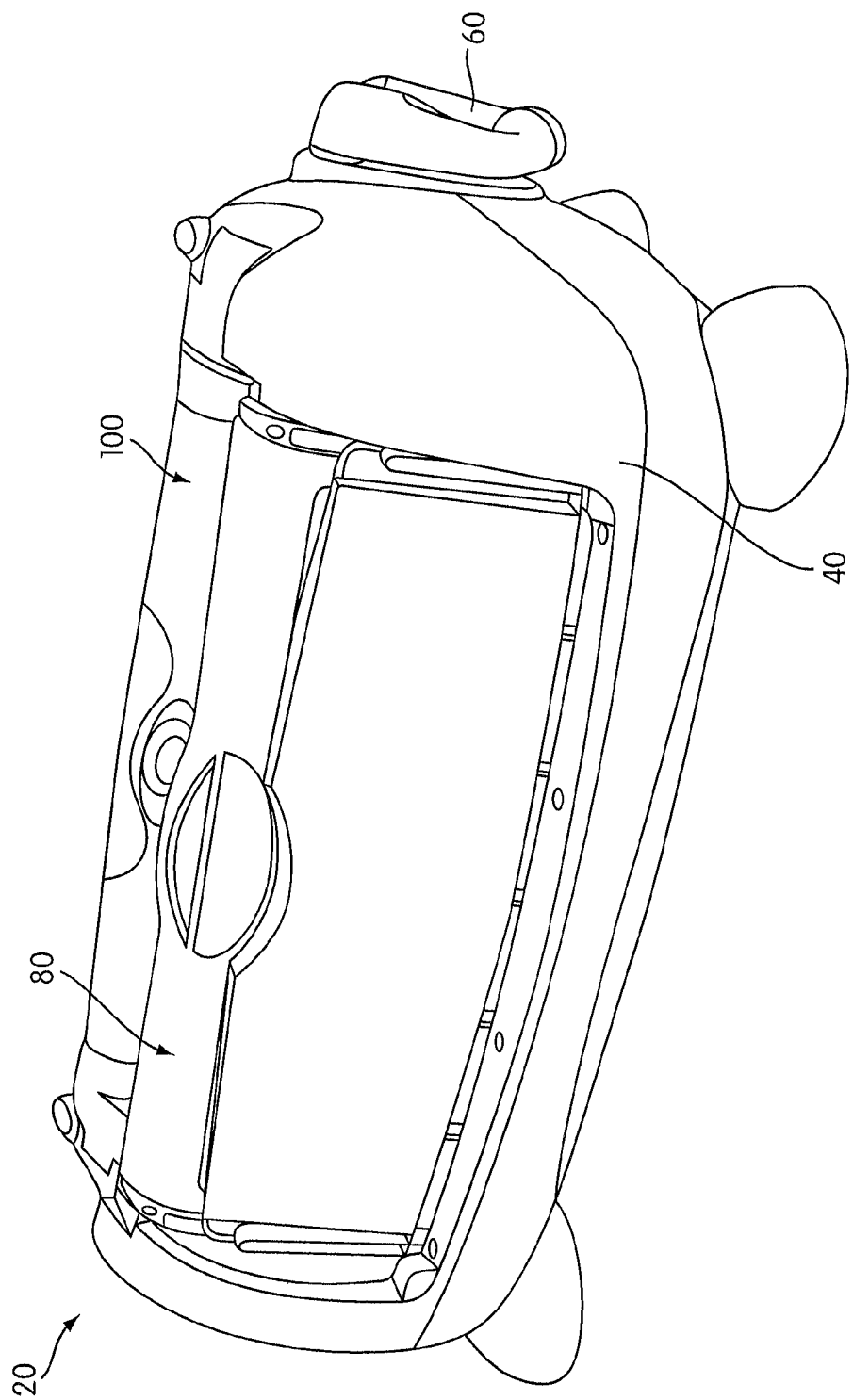
FIG. 1A is a perspective view of an embodiment of a master processing apparatus of the present invention, having a feed roll cartridge and a pressure applicator assembly cartridge therein.

FIG. 1A shows a perspective view of an embodiment of a master processing apparatus 20. The master processing apparatus 20 comprises an apparatus frame 40, and a hand crank 60. In the illustrated embodiment, a feed roll cartridge 80 and a pressure applicator assembly cartridge 100 are configured to be removably mounted to the apparatus frame 40 in the master processing apparatus 20. In other embodiments, either or both of the cartridges, or their constituent components described below, may be fixedly mounted to the apparatus frame 40.

Figure 1B:
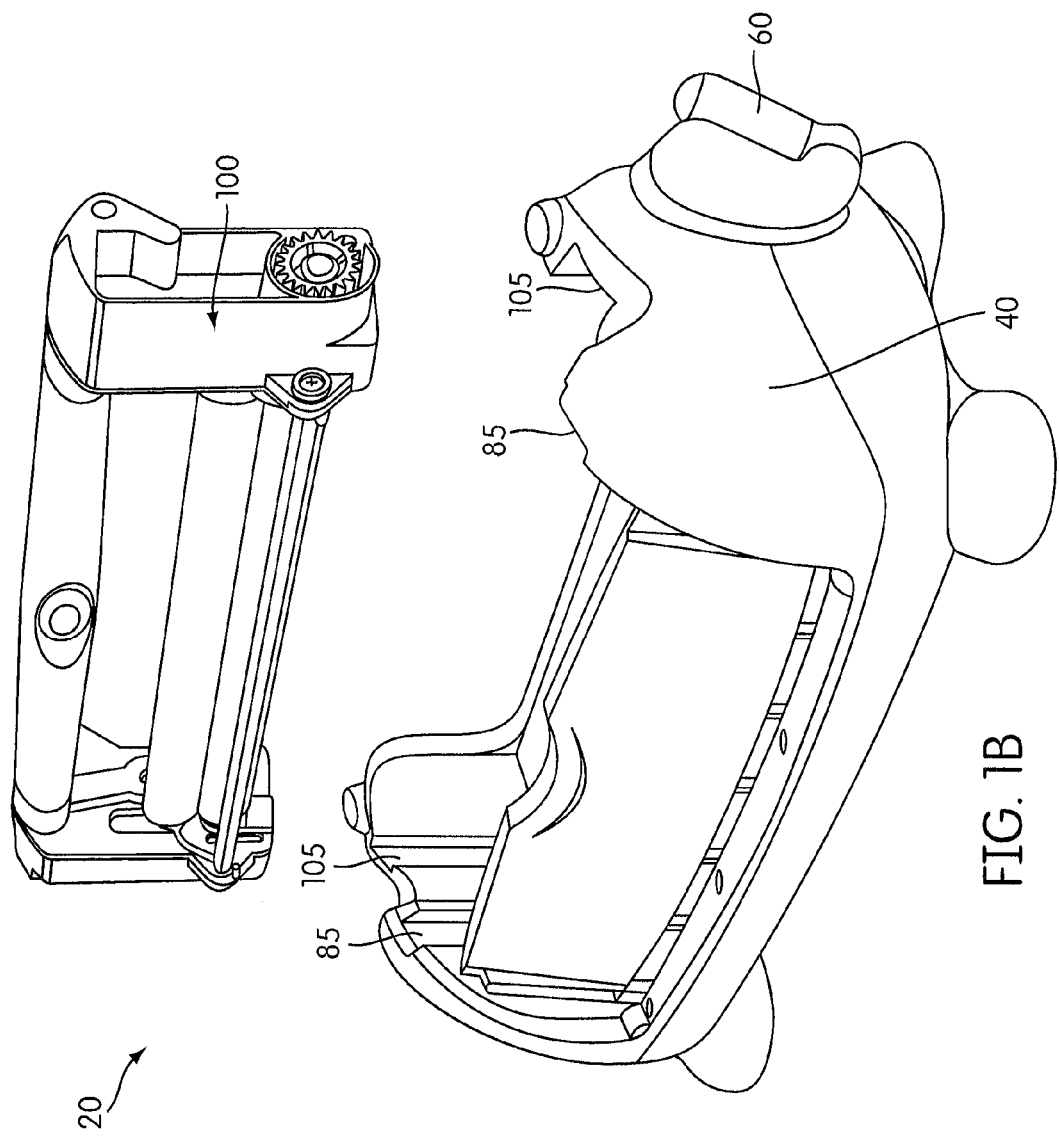
FIG. 1B is a perspective view of the master processing apparatus of FIG. 1A, with the feed roll cartridge removed and omitted, and the pressure applicator assembly cartridge removed but positioned for insertion.
Figure 1C:
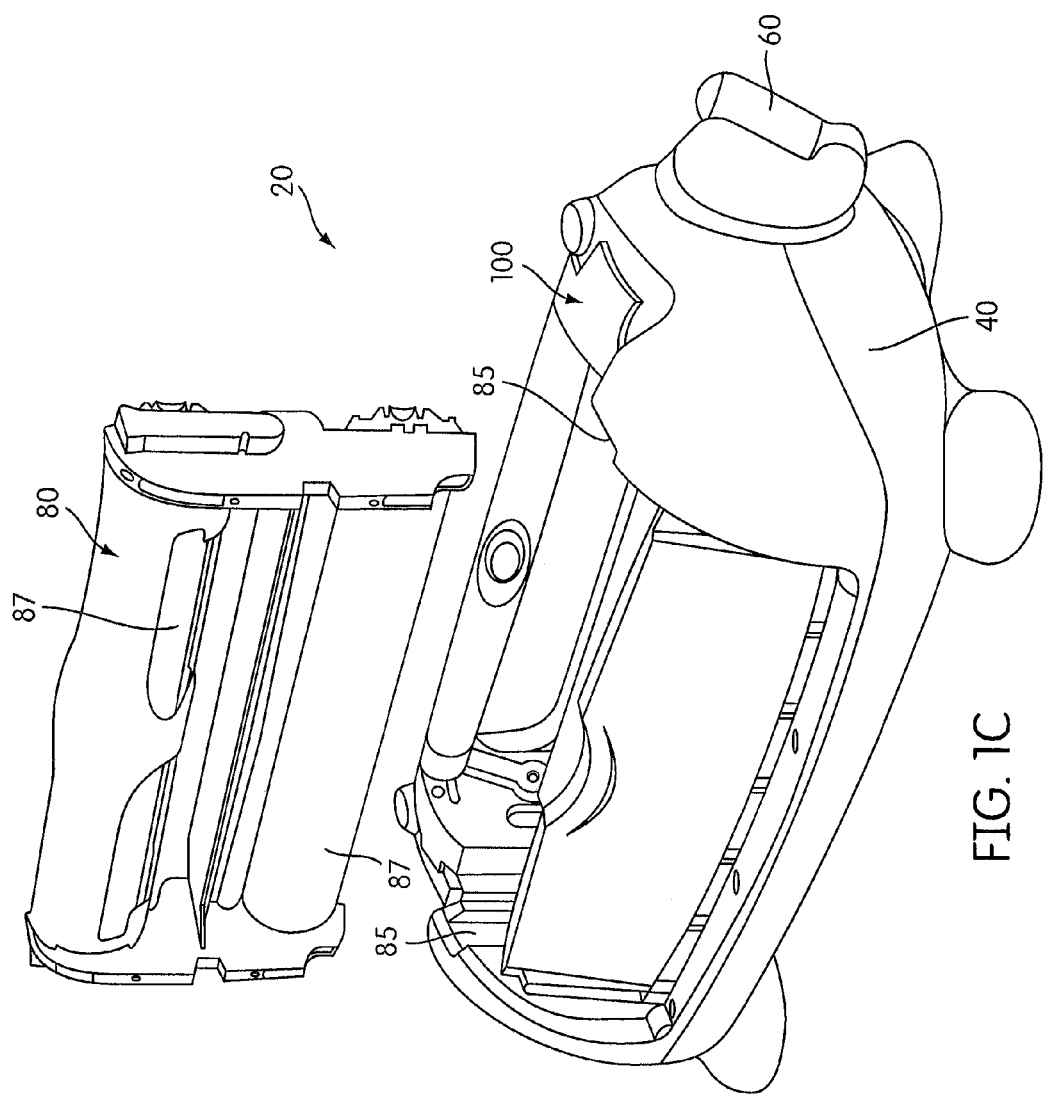
FIG. 1C is a perspective view of the master processing apparatus of FIG. 1A, with the feed roll cartridge removed but positioned for insertion, and the pressure applicator assembly cartridge inserted therein.

The removable mounting of the feed roll cartridge 80 and the pressure applicator assembly cartridge 100 may be seen in FIGS. 1B and 1C. FIG. 1B shows the master processing apparatus 20 with neither the feed roll cartridge 80 nor the pressure applicator assembly cartridge 100 mounted into the apparatus frame 40. As shown, the apparatus frame 40 includes a feed roll cartridge slot 85 configured to receive the feed roll cartridge 80, which is omitted from FIG. 1B for clarity. The apparatus frame 40 also includes a processing cartridge slot 105 which, as depicted, may be configured to receive the pressure applicator assembly cartridge 100.

As shown in FIG. 1B, the pressure applicator assembly cartridge 100 may be lowered into the processing cartridge slot 105, and configured such that the handle 60 of the master processing apparatus 20 may operate a processing action of the pressure applicator assembly cartridge 100, as is described in greater detail below. The lowering of the pressure applicator assembly cartridge 100 into slot 105 is shown in FIG. 1C, which additionally shows the feed roll cartridge 80 positioned to be lowered into the feed roll cartridge slot 85. In an embodiment, the feed roll cartridge 80 may contain one or more feed rolls 87. Each feed roll 87 may be comprise a roll of stock material, which may include a film (such as a clear laminating material), a roll of masters to be processed, a roll of backing material that carries an adhesive, or any other material wound around the roll to assist in the processing of a master. In an embodiment, handle 60 may further be configured to unwind the stock material from the feed roll. In other embodiments, the handle 60 may operate the processing action of the pressure applicator assembly cartridge 100, which may unwind the feed rolls 87 to pull stock material therethrough for use in the master processing operation.

Figure 2A:
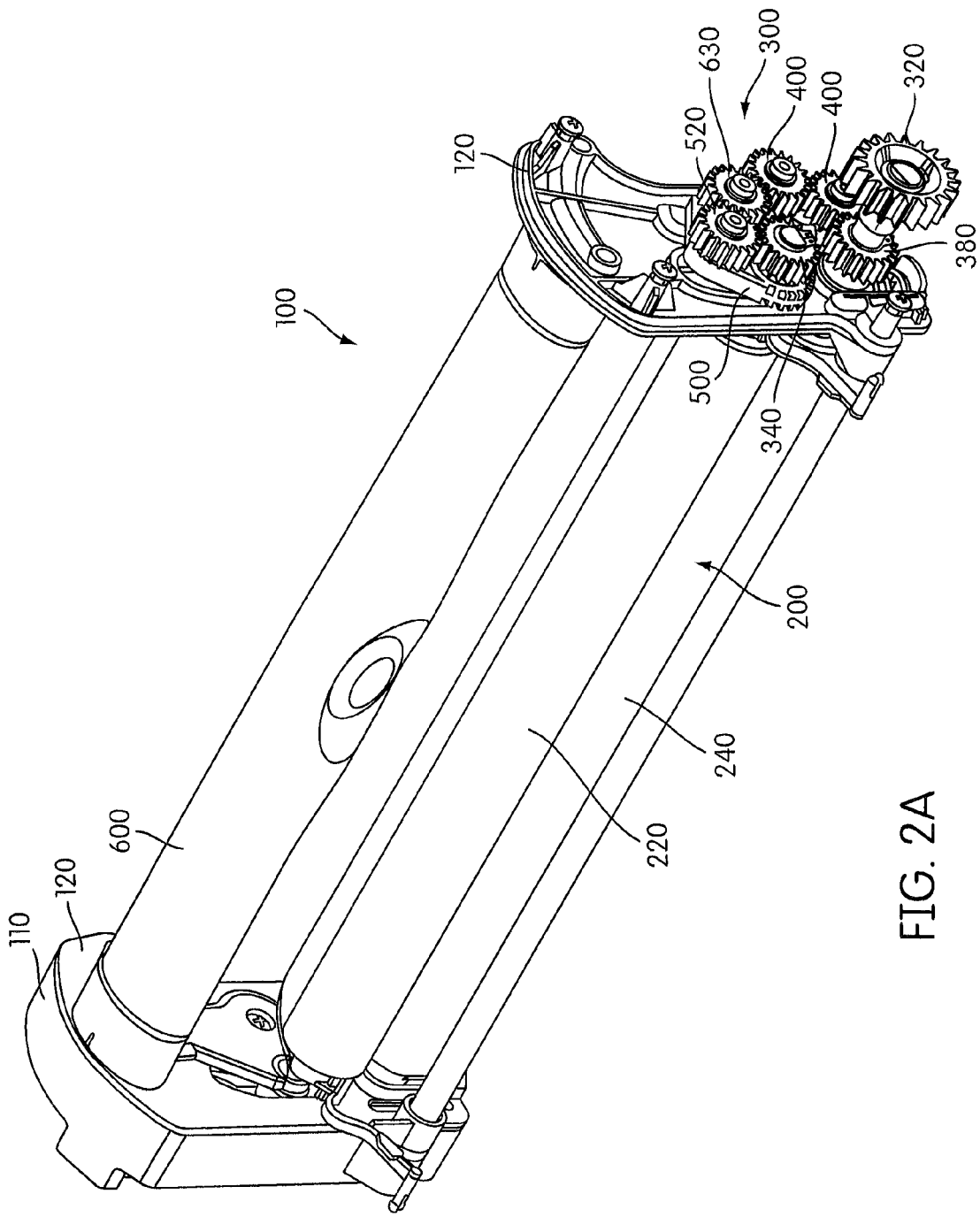
FIG. 2A is a top front perspective view of a part of the master processing apparatus of FIG. 1, showing a plurality of gears used to drive a first and a second pressure applying roller.

FIG. 2A shows an isolated top perspective view of an embodiment of the pressure applicator assembly cartridge 100, with a portion of a gear train exposed. The pressure applicator assembly cartridge 100 contains a cartridge frame 110, which holds a pair of rollers 200. The cartridge frame 110 may have any suitable construction or configuration, including but not limited to plastic, wood, metal, or combinations thereof. The cartridge frame 110 may comprise a pair of side plates 120, between which the pair of rollers 200 may each extend transversely. The pair of rollers 200, which include a first pressure applying roller 220; and a second pressure applying roller 240, may also have any suitable construction or configuration, including but not limited to plastic, rubber, wood, metal, or combinations thereof. The pair of rollers 200 may be of a generally resilient nature that aids in transferring applied pressure to a master fed therein during a master processing operation.

The first pressure applying roller 220 and the second pressure applying roller 240 may be configured to rotate about parallel roller axes, and may be driven by input torque transferred to the pair of rollers 200 through a plurality of gears 300 which rotate about respective gear axes parallel to the roller axes. The plurality of gears 300 may be of any suitable construction, including but not limited to plastic, metal, or combinations thereof, and may include an input gear 320 for receiving the input torque. In the illustrated embodiment, the input torque may be generated through the turning of the hand crank 60 by a user of the master processing apparatus 20. The input torque can also be generated by any other suitable process including but not limited to an electric motor or a pedal. In embodiments where the above-described gear and roller elements are part of the pressure applicator assembly cartridge 100, the input gear 320 may be configured to be external to the cartridge frame 110, and may be further configured to internest with a cartridge contacting gear in the master processing apparatus 20. In such an embodiment, input torque generated through the master processing apparatus 20 may transfer to the plurality of gears 300 through the intermeshed cartridge contacting gear and the input gear 320 when the pressure applicator assembly cartridge 100 is inserted into a corresponding receptacle of the master processing apparatus 20. The cartridge contacting gear may be operatively connected to source of the input torque, so in the illustrated embodiment may be operatively connected to the hand crank 60.

The plurality of gears 300 may also contain a first roller gear 340 that is coaxial with and connected to the first pressure applying roller 220, and a pivot plate gear 360 for transferring input torque from the input gear 320 to the first roller gear 340. In an embodiment, the plurality of gears 300 may also comprise a second roller gear 380 that is coaxial with and connected to the second pressure applying roller 240. In an embodiment, the plurality of gears 300 are intermeshed for simultaneous counter-rotation of both the first pressure applying roller 220 and the second pressure applying roller 240. In an embodiment, the simultaneous counter-rotation will be in a direction that corresponds to pulling a master through the master processing apparatus 20 when the hand crank 60 is rotated in a clockwise direction. In an embodiment, the input gear 320 is coaxial with and connected to the second roller gear 380 and the second pressure applying roller 240. In other embodiments, the input gear 320 may be coaxial with and connected to any other suitable gear, including but not limited to the pivot plate gear 360, or an intermediate gear 400.

The master processing apparatus 20 may also comprise a pivot plate 500 that is mounted for pivotal movement about the axis of the pivot plate gear 360. The pivot plate 500, like the other components of the present invention, may be of any suitable construction or configuration, including but not limited to wood, plastic, metal, or combinations thereof. The first roller gear 340 and the first pressure applying roller 220 may be connected to the pivot plate 500, with their axes spaced radially from the axis of the pivot plate gear 360 to permit a range of arcuate movement of the pivot plate 500, corresponding to linear, substantially linear, or arcuate movement of the first pressure applying roller 220. This range of movement of the first pressure applying roller 220 may allow the first pressure applying roller 220 to move to adjust a spacing between the pair of rollers 200. The plurality of gears 300 are configured to remain intermeshed throughout the range of movement of the pivot plate 500 and the first pressure applying roller 220. In an embodiment, the plurality of gears 300 may comprise an intermediate pivot plate gear 520, rotatably mounted to the pivot plate 500 and configured to remain intermeshed with the first roller gear 340 and the pivot plate gear 360, to transfer input torque from the pivot plate gear 360 to the first roller gear 340 throughout the range of arcuate movement.

In an embodiment, the first pressure applying roller 220 is biased towards the second pressure applying roller 240 by way of at least one torsion spring TS (obscured in FIG. 2A). In some embodiments, the torsion spring TS biases the first pressure applying roller 220 and the pivot plate 500, resisting against corresponding movements of the first pressure applying roller 220 in a direction away from the second pressure applying roller 240 in its range of motion, and the arcuate movement of the pivot plate 500. The torsion spring TS may be of any suitable construction or configuration, including but not limited to metal or plastic, and may have any suitable spring constant. In an embodiment, the spring constant and configuration of the torsion spring is such that the force applied between the first pressure applying roller 220 and the second pressure applying roller 240 varies less than approximately 18% over the range of movement. In other embodiments, the force may vary by less than approximately 12%, less than approximately 8%, less than approximately 4%, or less than approximately 2%, across the range of movement. The torsion spring TS is discussed in greater detail below.

In an embodiment, the range of pivotal movement of the pivot plate 500 may be directly or indirectly controlled by a handle 600. For example, in one embodiment the handle 600 may be configured to receive an input force to cause corresponding arcuate movement about the axis of the pivot plate gear 360. This arcuate movement of the handle 600 may cause a corresponding movement of the first pressure applying roller 220 away from the second pressure applying roller 240, which may result in a subsequent pivotal movement of the pivot plate 500. In another embodiment, the handle 600 may be configured to directly cause pivoting of the pivot plate 500, which may result in a subsequent movement of the first pressure applying roller 220 away from the second pressure applying roller 240.

Figure 2B:
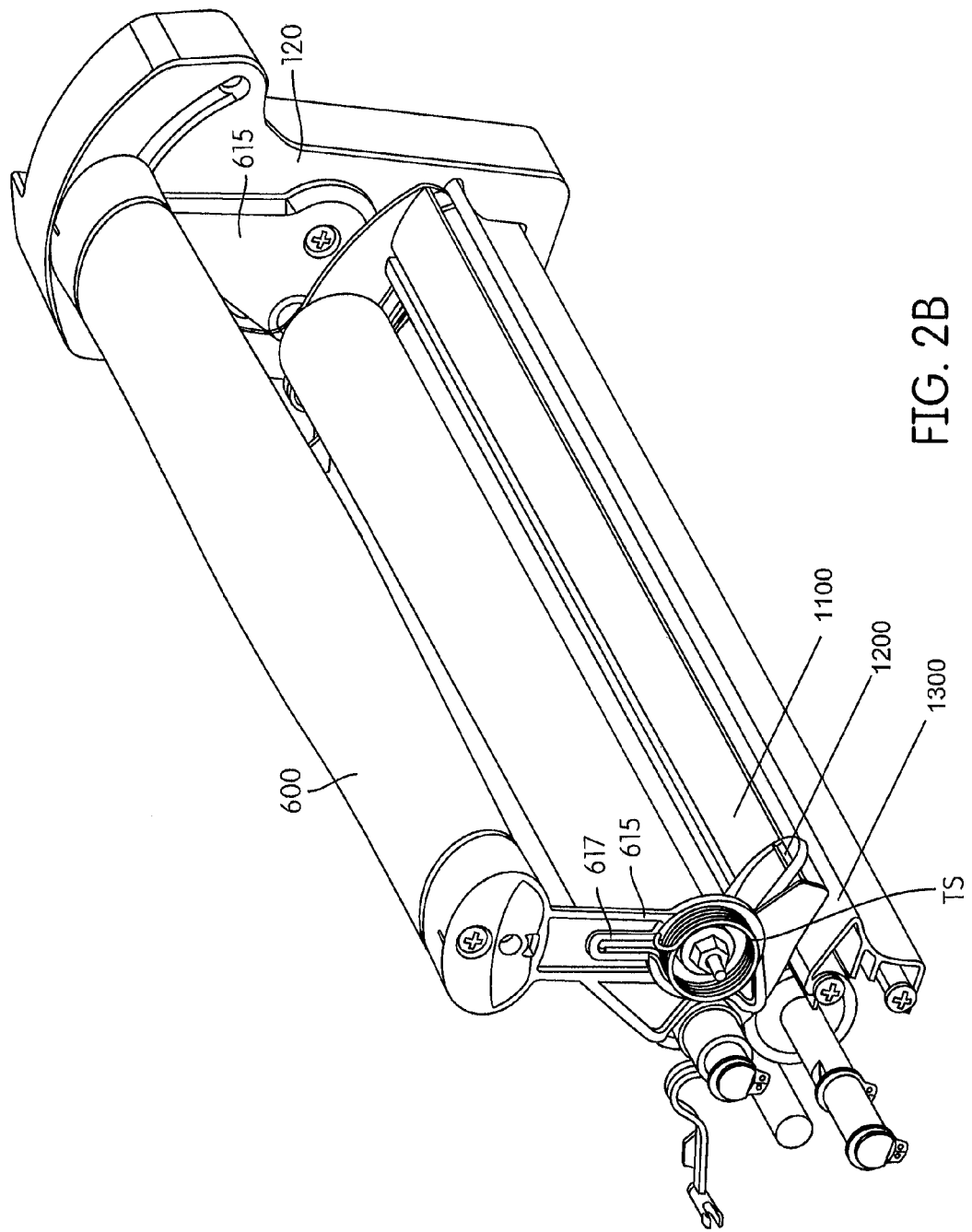
FIG. 2B is a reduced top rear perspective view of the part of the master processing apparatus of FIG. 2A, without elements such as the plurality of gears, to show a torsion spring contained therein.

The torsion spring TS can be seen in FIG. 2B, which depicts the pressure applicator assembly cartridge 100 in reduced form, without the plurality of gears 300, the pivot plate 500, and an associated one of the side plates 120, among other things. As shown in the illustrated embodiment, the at least one torsion spring TS may be at least partially located within at least one cam 615 of the handle 600. In an embodiment, the torsion spring TS may be located between the cam 615 of the handle 600 and the side plate 120 (the associated side plate 120 being omitted in FIG. 2B for clarity). In an embodiment, the torsion spring TS may comprise an arm associated with the cam 615, and an arm associated with the side plate 120 proximal to the cam 615, such that movement of the handle 600 applies a torsion force to the torsion spring TS. In an embodiment, the torsion force may be a helical torsion force, such that the arm associated with the cam 615 is configured to be biased by the torsion spring TS to return to a default position, described in greater detail below. In an embodiment, the cam 615 may comprise a spring contacting portion 617, configured to move the arm of the torsion spring TS associated with the cam 615 when the handle 600 is moved. The spring contacting portion 617 of the cam 615 may be of any suitable construction or configuration, including but not limited to a molded groove into which the arm of the torsion spring TS associated with the cam 615 may be received by. Although not shown in FIG. 2B, the side plate 120 may comprise a corresponding second spring contacting portion, configured to hold an opposing portion of the torsion spring TS generally fixed, so that movement of the arm of the torsion spring TS associated with the cam 615 of the handle 600, while the arm of the torsion spring associated with the side plate 120 remains fixed, causes a torsion force in the torsion spring TS, biasing against the movement of the handle 600 away from a default position, corresponding with a default spacing between the pair of rollers 200, described below.

Figure 3:
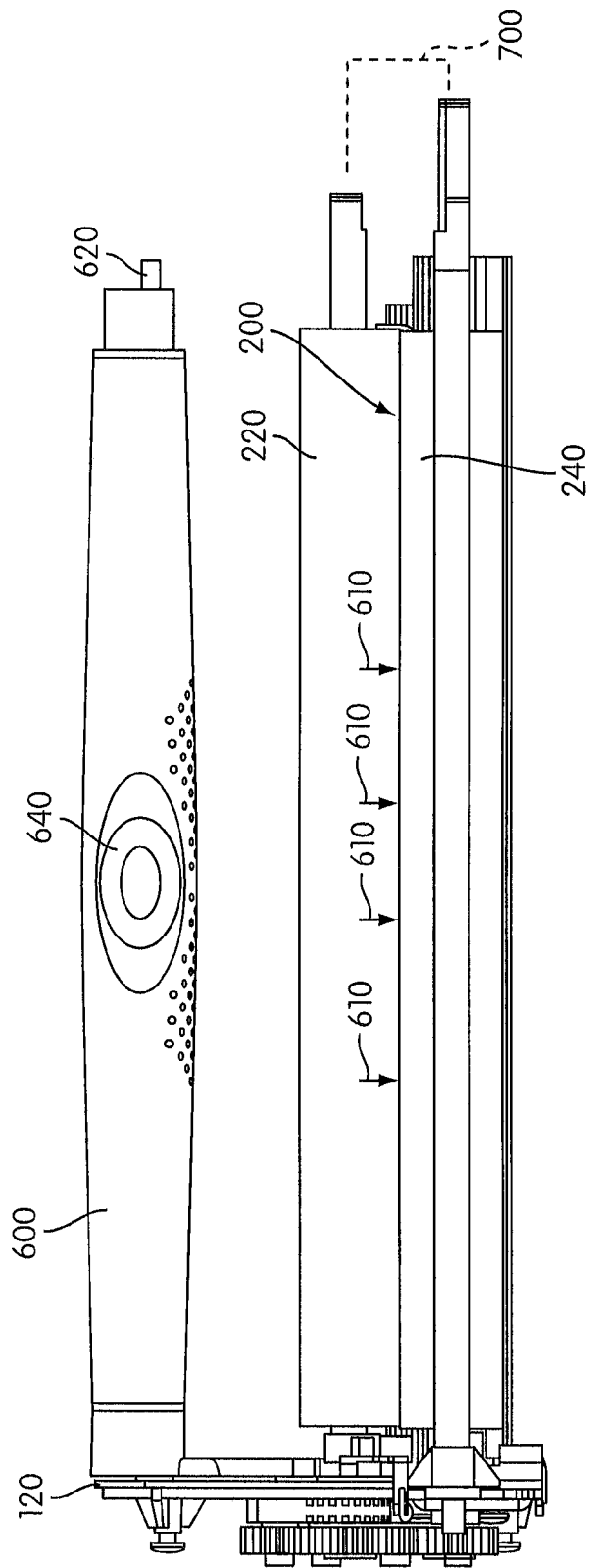
FIG. 3 is a front view of the embodiment of FIG. 2A, with the first pressure applying roller in an unlocked floating position.

In the non-limiting embodiment illustrated in FIG. 3, the first pressure applying roller 220 will generally be in a default position in contact with the second pressure applying roller 240, unless a master fed therein separates the pair of rollers 200. Generally the default position of the first pressure applying roller 220 will correspond to a particular spacing 700 measured as the distance between the centers of the pair of rollers 200. When a master is fed between the pair of rollers 200, characteristics of the master, such as the master's thickness, may adjust the spacing 700 to a greater than default value, with the first pressure applying roller 220 remaining biased towards the second pressure applying roller 240 in a direction of bias 610, applying pressure to the master.

In an embodiment, the handle 600 may comprise a lock, shown in the non-limiting illustrated embodiment as at least one spring lock 620, configured to hold the first pressure applying roller 220 in a particular greater than default spacing 700 away from the second pressure applying roller 240, against the direction of bias 610. The handle 600 may further comprise a lock control 640. The lock control 640 may be of any suitable construction or configuration, including but not limited to a push button that retracts the at least one spring lock 620 from at least one locking receptacle 680 in the side plates 120. In an embodiment, the handle 600 comprises a pair of retractable spring locks 620, wherein each retractable spring lock 620 will be biased outward along an axis parallel to the axis of the handle 600, and the pair of rollers 200. The pair of spring locks 620 may correspond with at least one pair of locking receptacles 680, wherein there may be one pair of locking receptacles 680 (one locking receptacle at each end of the handle) for at least one locking position.

Figure 4:
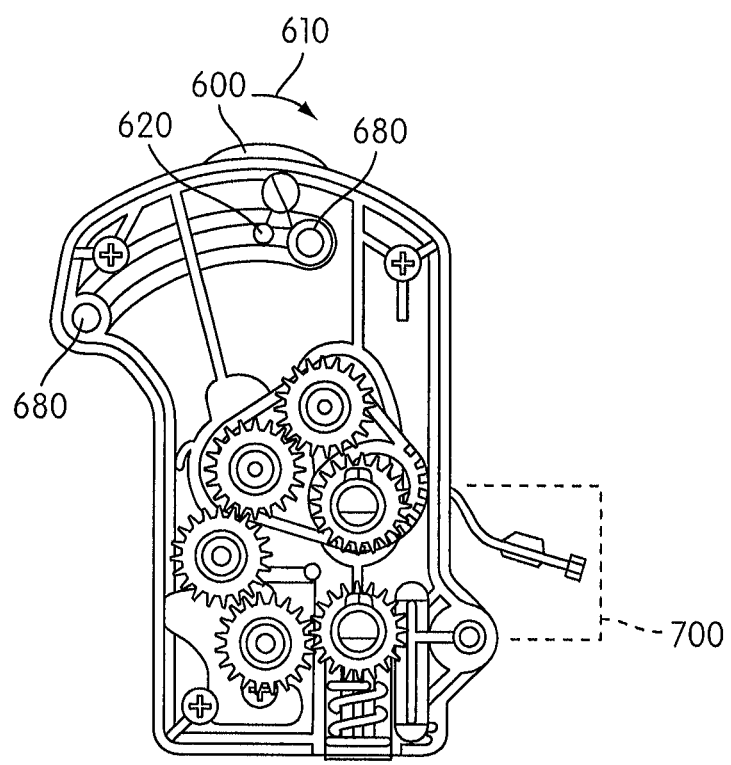
FIG. 4 is a side view of the embodiment of FIG. 2A, showing the plurality of gears when the first pressure applying roller is in the unlocked floating position depicted in FIG. 3.

As seen in FIG. 4, when the handle 600 is in the default position, the spring lock 620 does not hold the handle 600 in one of the locking receptacles 680. Instead, the handle 600 and the first pressure applying roller 220 may remain movable in corresponding ranges of movement, wherein the spacing 700 between the first pressure applying roller 220 and the second pressure applying roller 240 is determined by the presence and characteristics of a master positioned between the pair of rollers 200, and the force of the torsion spring in the direction of bias 610, exerting pressure on the master through the first pressure applying roller 220.

Figure 5:
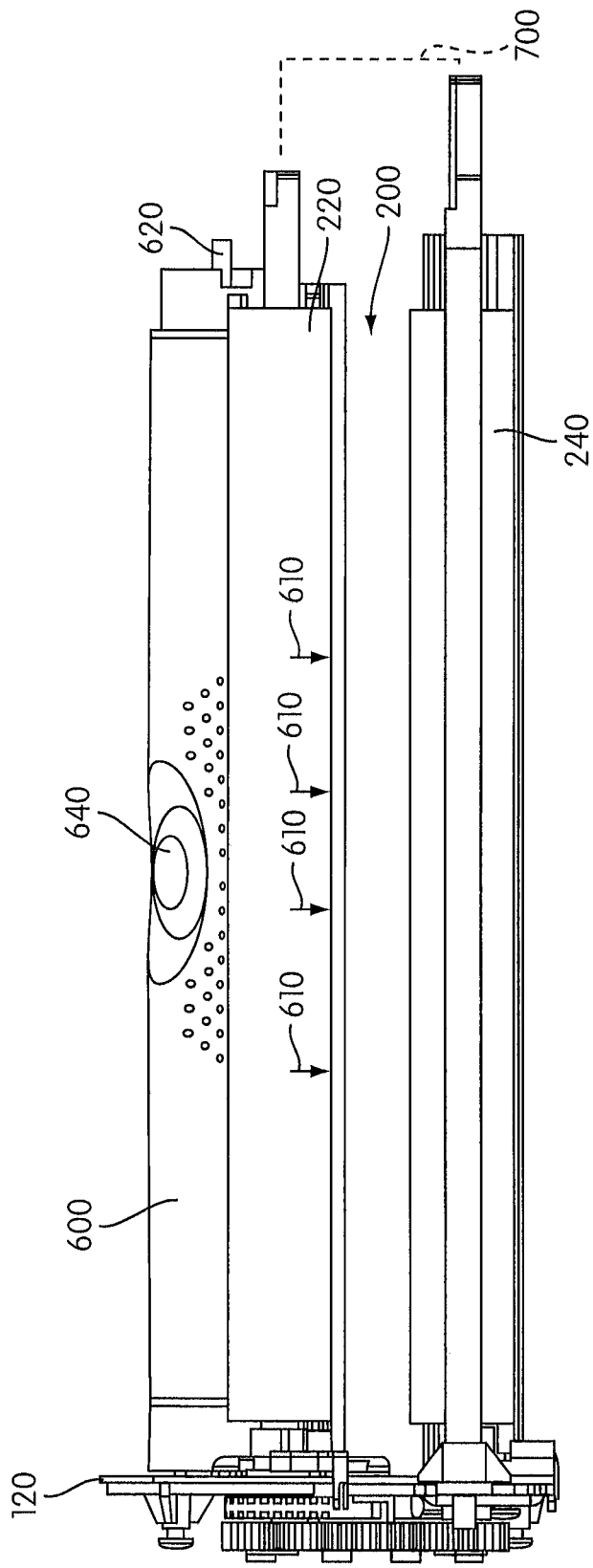
FIG. 5 is a front view of the embodiment of FIG. 2A, with the first pressure applying roller in a first locked position away from the second pressure applying roller.
Figure 6:
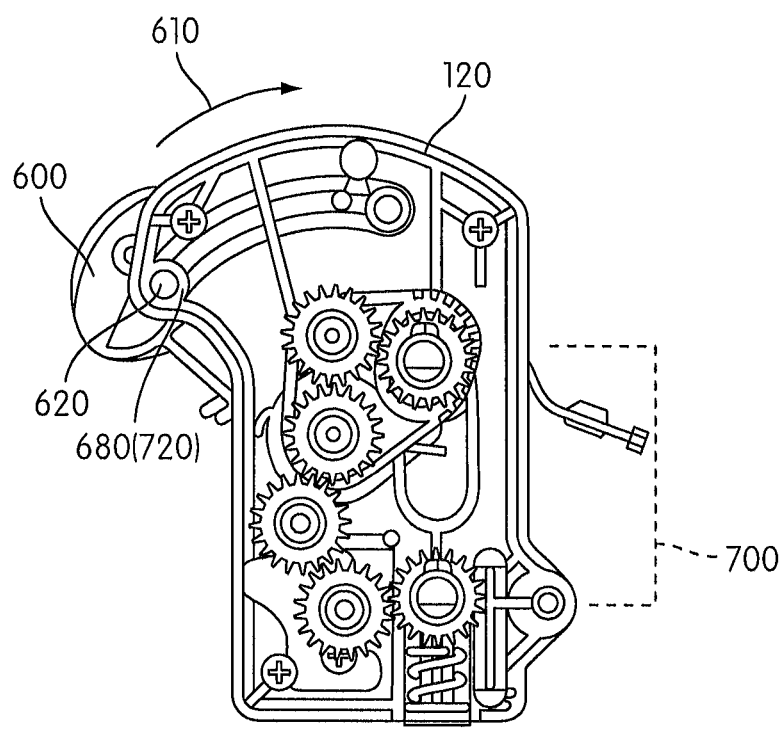
FIG. 6 is a side view of the embodiment of FIG. 2A, showing the plurality of gears when the first pressure applying roller is held in the first locked position away from the second pressure applying roller depicted in FIG. 5.

FIG. 5 shows an embodiment wherein the first pressure applying roller 220 is held away from the second pressure applying roller 240 to give a greater than default value for the spacing 700, providing a gap between the pair of rollers 200. Such a gap may be useful for any number of purposes, including simplifying the process of loading a master into the master processing apparatus 20. In some embodiments, the gap may correspond to a predefined width useful for the placement of a die plate for a die cutting operation. As seen in FIG. 6, to hold the spacing 700 at the greater than default value, the handle 600 may be positioned in the range of arcuate movement so that the spring lock 620 engages the locking receptacle 680 which corresponds to a first locked position 720. In an embodiment, the first locked position 720 may correspond to a maximum spacing between the pair of rollers 200, and a maximum position in the range of arcuate movement of the handle 600 away from the default position. The spring lock 620 engaging the locking receptacle 680 corresponding to the first locked position 720 may prevent the handle from succumbing to the force of the torsion spring in the direction of bias 610, preventing the movement of the handle 600 back towards the default position.

Figure 7:
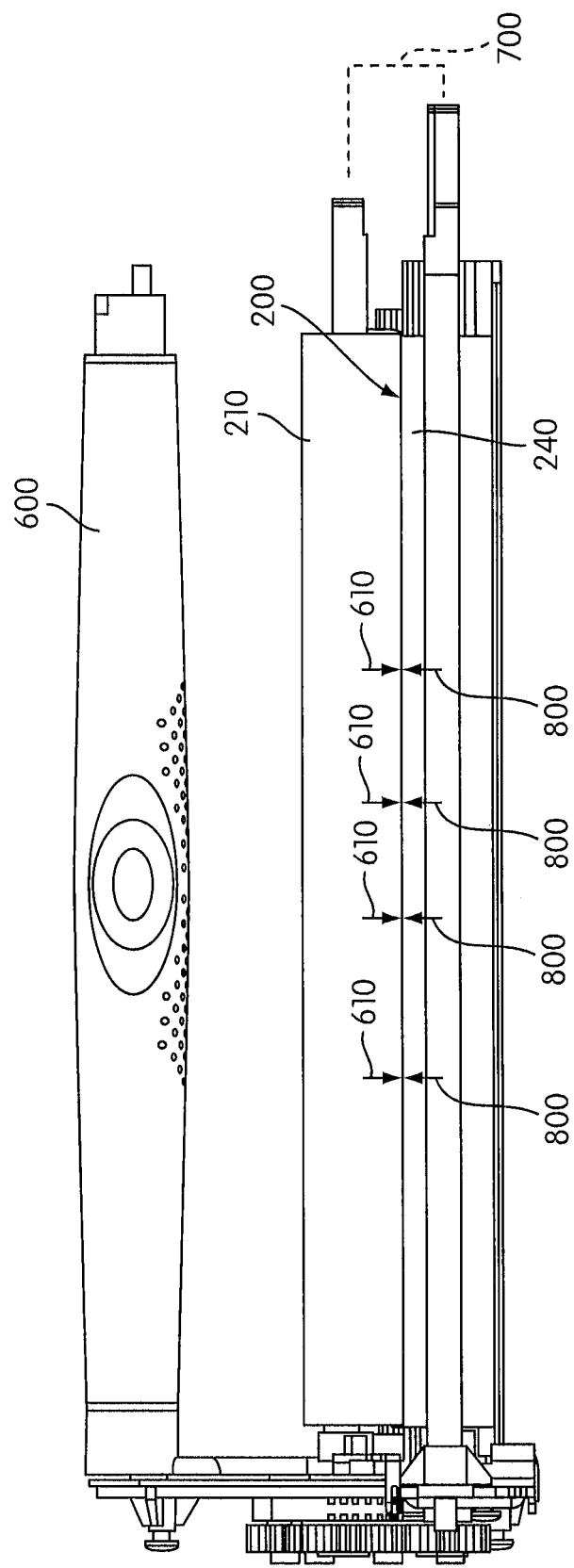
FIG. 7 is a front view of the embodiment of FIG. 2A, with the first pressure applying roller in a second locked position towards the second pressure applying roller.
Figure 8:
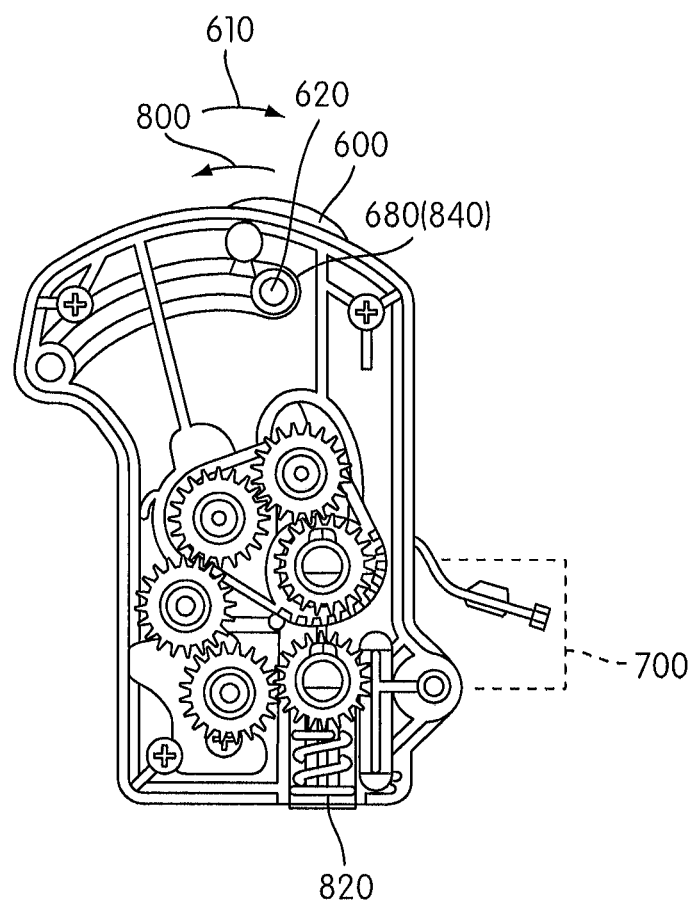
FIG. 8 is a side view of the embodiment of FIG. 2A, showing the plurality of gears when the first pressure applying roller is held in the second locked position towards the second pressure applying roller depicted in FIG. 7.

In an embodiment as seen in FIG. 7, the direction of bias 610 of the first pressure applying roller 220 towards the second pressure applying roller 240 may be complemented by a second bias 800 to the second pressure applying roller 240 directed towards the first pressure applying roller 220, creating a high pressure area between the pair of rollers 200. In such an embodiment, the spacing 700 may be lesser than the default value, due to compression of the outer surfaces of the pair of rollers 200 as they are pushed into one another, and heightened compression of any master placed therein. As seen in FIG. 8, the source of the second bias 800 may be from at least one compression spring 820. The at least one compression spring 820 may be of any suitable construction or configuration, including but not limited to metal or plastic, and may have any suitable spring constant. In an embodiment, the at least one compression spring 820 may be configured to compress along an axis generally perpendicular to the axis of the second pressure applying roller 240, and may support the second pressure applying roller 240.

In an embodiment, the handle 600 may be positioned in the range of arcuate movement so that the spring lock 620 engages a locking receptacle 680 which corresponds to a second locked position 840. In an embodiment, the second locked position 840 may correspond to a position where the handle 600 is pushed in the direction of bias 610, wherein the first pressure applying roller 220 is pushed into the second pressure applying roller 240, causing compression of the at least one compression spring 820, resulting in the second bias 800. In an embodiment, the second bias 800 resulting from the at least one compression spring 820 may be stronger than the direction of bias 610 resulting from the at least one torsion spring when the handle 600 is unlocked, so that the default position of the handle 600 does not correspond to a compression of the at least one compression spring 820 resulting from the bias at least one torsion spring in the direction of bias 610.

As seen in FIG. 9, in various embodiments there may exist a plurality of mirror gears 900 rotatable about respective mirror gear axes parallel to the axes of the pair of rollers 200. The plurality of mirror gears 900 may provide redundancy to the plurality of gears 300, may serve to balance the action of the plurality of gears 300, and may provide a smoother master processing operation. As seen in the illustrated embodiment, the plurality of mirror gears 900 may include a mirror first roller gear 940, coaxial with and connected to the first pressure applying roller 220 located at an opposite end of the first pressure applying roller 220 than that containing the first roller gear 340. The plurality of mirror gears 900 may further comprise a mirror pivot plate gear 960, as well as a mirror second roller gear 980 that is coaxial with and connected to the second pressure applying roller 240, located at an opposite end of the second pressure applying roller 240 than that containing the first roller gear 380. Such embodiments with a plurality of mirror gears 900 may also comprise a mirror pivot plate 1000, mounted for pivotal movement about the axis of the mirror pivot plate gear 960. In such an embodiment, the mirror first roller gear 940 and the first pressure applying roller 220 may be connected to the mirror pivot plate 1000 with their axes spaced radially from the axis of the mirror pivot plate gear 960, permitting the same range of movement at both ends of the first pressure applying roller 220, wherein the plurality of mirror gears 900 remain intermeshed throughout the range of movement for the first pressure applying roller 220.

As FIG. 9 further shows, in various embodiments there may exist a cutting guide member 1100, which may be affixed generally parallel to the first pressure applying roller 220, and configured to move with the first pressure applying roller 220 through its range of movement away from the second pressure applying roller 240. This cutting guide member 1100 is also illustrated in FIG. 2B, described above. The cutting guide member 1100 may be of any suitable construction or configuration, including but not limited to plastic, metal, or combinations thereof. In an embodiment, the cutting guide member 1100 may be configured to pivot radially about the axis of the first pressure applying roller 220. In an embodiment, the cutting guide member 1100 may be biased to a position generally horizontal with the first pressure applying roller 220. In an embodiment, the ability for the cutting guide member 110 1100 to pivot may be limited while the handle 600 is in the first locked position 720. As a non-limiting example, when the first pressure applying roller 220 is locked away from the second pressure applying roller 240, the cutting guide member 1100 may be locked in a horizontal position adjacent to the first pressure applying roller 220, to prevent the cutting guide member 1100 from breaching a horizon established in the space between the pair of rollers 200. In an embodiment, the cutting guide member 1100 may be constructed of a transparent material, permitting one to view through it to align a master with it.

Configured to run along the cutting guide member 1100 there may be a cutting blade 1200. The cutting blade 1200 may be of any suitable construction or configuration, including metal, plastic, or combinations thereof. In an embodiment, the cutting blade 1200 may include a plastic clip slideably mounted to the cutting guide member 1100, with a metal cutting element attached thereto. In various embodiments, the cutting blade 1200 may include a cutting element that is circular, chisel pointed, trapezoidal, or so on. In an embodiment, the cutting blade 1200 may be removable from the cutting guide member for replacement. As visible in FIG. 2B, in an embodiment, there may exist a cutting surface 1300 generally horizontal to the second pressure applying roller 240, against which the cutting guide member 1100 may be pivoted for the cutting blade 1200 to cut against. The cutting surface 1300 may be of any suitable construction or configuration, including but not limited to metal, and may be generally resistant to the repeated cutting actions of the cutting blade 1200.

As noted previously, in various embodiments, the gear and roller elements described above may be mounted directly into the apparatus frame 40 of the master processing apparatus 20. In some embodiments, the gear and roller elements may be part of the pressure applicator assembly cartridge 100 having a separate cartridge frame 110. In an embodiment, the pressure applicator assembly cartridge 100 may couple with or be removable from the corresponding processing cartridge slot 105 in the master processing apparatus 20. The master processing apparatus 20 may be able to accept a number of different cartridges in the processing cartridge slot 105, wherein each cartridge may be configured to perform different processing operations on a master. As a non-limiting example, other cartridges may include a die press cartridge, an embossing cartridge, or a strip cutting cartridge.

While certain embodiments of the invention have been shown and described it is evident that variations and modifications are possible that are within the spirit and scope of the following claims. The disclosed embodiments have been provided solely to illustrate the principles of the invention and should not be considered limiting in any way.

What is claimed is:

1. A master processing apparatus comprising:
a frame;
a first pressure applying roller;
a second pressure applying roller, the pressure applying rollers being rotatable about parallel roller axes;
a plurality of gears rotatable about respective gear axes parallel to the roller axes, the plurality of gears comprising:
(a) an input gear for receiving input torque,
(b) a first roller gear coaxial with and connected to the first pressure applying roller, and
(c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller,
wherein the plurality of gears further comprises a second roller gear coaxial with and connected to the second pressure applying roller, the plurality of gears being intermeshed for simultaneous counter-rotation of both the first and second pressure applying rollers.

2. A master processing apparatus according to claim 1, wherein a spring constant and configuration of the spring is such that the force applied between the first and second pressure applying rollers varies less than 18% over the range of arcuate movement.

3. A master processing apparatus according to claim 2, wherein the spring constant and configuration of the spring is such that the force applied between the first and second pressure applying rollers varies less than 12% over the range of arcuate movement.

4. A master processing apparatus according to claim 3, wherein the spring constant and configuration of the spring is such that the force applied between the first and second pressure applying rollers varies less than 8% over the range of arcuate movement.

5. A master processing apparatus according to claim 4, wherein the spring constant and configuration of the spring is such that the force applied between the first and second pressure applying rollers varies less than 4% over the range of arcuate movement.

6. A master processing apparatus according to claim 5, wherein the spring constant and configuration of the spring is such that the force applied between the first and second pressure applying rollers varies less than 2% over the range of arcuate movement.

7. A master processing apparatus according to claim 1, wherein the plurality of gears further comprises an intermediate pivot plate gear rotatably mounted to the pivot plate gear, for rotation about an axis spaced radially from the axes of the pivot plate gear and the first roller gear and intermeshed with both the first roller gear and the pivot plate gear for transferring the input torque from the pivot plate gear to the first roller gear.

8. A master processing apparatus according to claim 1, wherein the input gear is coaxial with and connected to the second roller gear and the second pressure applying roller.

9. A master processing apparatus according to claim 1, further comprising a handle configured to receive an input force to cause a pivoting of the pivot plate.

10. A master processing apparatus according to claim 1, further comprising:
a plurality of mirror gears rotatable about respective mirror gear axes parallel to the roller axes, the plurality of mirror gears comprising:
(d) a mirror first roller gear coaxial with and connected to the first pressure applying roller, at an opposite end of the first pressure applying roller, and
(e) a mirror second roller gear coaxial with and connected to the second pressure applying roller, at an opposite end of the second pressure applying roller, receiving the input torque from the second pressure applying roller;
(f) a mirror pivot plate gear for transferring the input torque from the mirror second roller gear to the mirror first roller gear;
a mirror pivot plate mounted for pivotal movement about the axis of the mirror pivot plate gear; and
the mirror first roller gear and the first pressure applying roller being connected to the mirror pivot plate with their axes spaced radially from the axis of the mirror pivot plate gear to permit the range of arcuate movement for the first pressure applying roller for adjusting the spacing between the first and second pressure applying rollers, the plurality of mirror gears being configured to remain intermeshed throughout the range of arcuate movement for the first pressure applying roller.

11. A master processing apparatus comprising:
a frame;
a first pressure applying roller;

a second pressure applying roller, the pressure applying rollers being rotatable about parallel roller axes;
a plurality of gears rotatable about respective gear axes parallel to the roller axes, the plurality of gears comprising:
  (a) an input gear for receiving input torque,
  (b) a first roller gear coaxial with and connected to the first pressure applying roller, and
  (c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller;
a handle configured to receive an input force to cause a pivoting of the pivot plate;
a spring lock within the handle; and
wherein the spring lock is configured to selectively hold the handle in a first locked position, causing the first pressure applying roller to be held in a first spacing from the second pressure applying roller.

12. A master processing apparatus according to claim 11, wherein:
the spring lock is also configured to selectively hold the handle in a second locked position, causing the first pressure applying roller to be pressed against the second pressure applying roller.

13. A master processing apparatus according to claim 12, further comprising:
at least one compression spring, configured to compress along an axis generally perpendicular to the axis of the second pressure applying roller, supporting the second pressure applying roller;
wherein causing the first pressure applying roller to be pressed against the second pressure applying roller causes a compression of the at least one compression spring.

14. A master processing apparatus comprising:
a frame;
a first pressure applying roller;
a second pressure applying roller, the pressure applying rollers being rotatable about parallel roller axes;
a plurality of gears rotatable about respective gear axes parallel to the roller axes, the plurality of gears comprising:
  (a) an input gear for receiving input torque,
  (b) a first roller gear coaxial with and connected to the first pressure applying roller, and
  (c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller,
wherein the spring is a torsion spring.

15. A master processing apparatus comprising:
a frame;
a first pressure applying roller;
a second pressure applying roller, the pressure applying rollers being rotatable about parallel roller axes;
a plurality of gears rotatable about respective gear axes parallel to the roller axes, the plurality of gears comprising:
  (a) an input gear for receiving input torque,
  (b) a first roller gear coaxial with and connected to the first pressure applying roller, and
  (c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller;
a cutting guide member, affixed parallel to the first pressure applying roller, and configured to move with the first pressure applying roller through the range of arcuate movement;
a cutting blade, configured to run along the cutting guide member to cut materials fed therein,
wherein the cutting blade is detachable from the cutting guide member.

16. A master processing apparatus according to claim 15, wherein the cutting guide member is further configured to pivot radially around the first pressure applying roller.

17. A master processing apparatus according to claim 16, wherein the cutting guide member locks in a raised position alongside the first pressure applying roller when the first pressure applying roller is at a maximum separation from the second pressure applying roller.

18. A master processing apparatus according to claim 15, further comprising a cutting surface parallel to and below the cutting guide member on a horizontal plane with the second pressure applying roller.

19. A pressure applicator assembly cartridge for mounting to a frame of a master processing apparatus comprising:
a cartridge frame configured to removably mount to the frame of a master processing apparatus
a first pressure applying roller;
a second pressure applying roller, the pressure applying rollers being rotatable about parallel roller axes;
a plurality of gears rotatable about respective gear axes parallel to the roller axes, the plurality of gears comprising:

(a) an input gear for receiving input torque,
(b) a first roller gear coaxial with and connected to the first pressure applying roller, and
(c) a pivot plate gear for transferring the input torque from the input gear to the first roller gear;

a pivot plate mounted for pivotal movement about the axis of the pivot plate gear;

the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and a spring about the pivot plate gear axis for biasing the pivot plate and first pressure applying roller towards the second pressure applying roller, wherein the plurality of gears further comprises a second roller gear coaxial with and connected to the second pressure applying roller, the plurality of gears being intermeshed for simultaneous counter-rotation of both the first and second pressure applying rollers.

20. A cartridge according to claim 19, wherein the plurality of gears further comprises an intermediate pivot plate gear rotatably mounted to the pivot plate gear, for rotation about an axis spaced radially from the axes of the pivot plate gear and the first roller gear and intermeshed with both the first roller gear and the pivot plate gear for transferring the input torque from the pivot plate gear to the first roller gear.

21. A cartridge according to claim 19, wherein the input gear is coaxial with and connected to the second roller gear and the second pressure applying roller.

22. A cartridge according to claim 21, further comprising a handle configured to receive an input force to cause a pivoting of the pivot plate.

23. A cartridge according to claim 21, wherein the input gear is configured to internest with a hand crank gear operatively connected to a hand crank on the master processing apparatus.

24. A cartridge according to claim 19, further comprising:
a plurality of mirror gears rotatable about respective mirror gear axes parallel to the roller axes, the plurality of mirror gears comprising:
(a) a mirror first roller gear coaxial with and connected to the first pressure applying roller, at an opposite end of the first pressure applying roller, and
(b) a mirror second roller gear coaxial with and connected to the second pressure applying roller, at an opposite end of the second pressure applying roller, receiving the input torque from the second pressure applying roller;
(c) a mirror pivot plate gear for transferring the input torque from the mirror second roller gear to the mirror first roller gear;

a mirror pivot plate mounted for pivotal movement about the axis of the mirror pivot plate gear; and the mirror first roller gear and the first pressure applying roller being connected to the mirror pivot plate with their axes spaced radially from the axis of the mirror pivot plate gear to permit the range of arcuate movement for the first pressure applying roller for adjusting the spacing between the first and second pressure applying rollers, the plurality of mirror gears being configured to remain intermeshed throughout the range of arcuate movement for the first pressure applying roller.

25. A pressure applicator assembly cartridge for mounting to a frame of a master processing apparatus comprising:
a cartridge frame configured to removably mount to the frame of a master processing apparatus
a first pressure applying roller;
a second pressure applying roller, the pressure applying rollers being rotatable about parallel roller axes;
a plurality of gears rotatable about respective gear axes parallel to the roller axes, the plurality of gears comprising:
(a) an input gear for receiving input torque,
(b) a first roller gear coaxial with and connected to the first pressure applying roller, and
(c) a pivot plate gear for transferring the input torque from the input gear to the first roller gear;

a pivot plate mounted for pivotal movement about the axis of the pivot plate gear;

the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and a spring about the pivot plate gear axis for biasing the pivot plate and first pressure applying roller towards the second pressure applying roller, wherein the spring is a torsion spring, and wherein a spring constant and configuration of the torsion spring is such that the force applied between the first and second pressure applying rollers varies less than 18% over the range of arcuate movement.

26. A master processing apparatus according to claim 25, wherein the spring constant and configuration of the torsion spring is such that the force applied between the first and second pressure applying rollers varies less than 12% over the range of arcuate movement.

27. A master processing apparatus according to claim 26, wherein the spring constant and configuration of the torsion spring is such that the force applied between the first and second pressure applying rollers varies less than 8% over the range of arcuate movement.

28. A master processing apparatus according to claim 27, wherein the spring constant and configuration of the torsion spring is such that the force applied between the first and second pressure applying rollers varies less than 4% over the range of arcuate movement.

29. A master processing apparatus according to claim 28, wherein the spring constant and configuration of the torsion spring is such that the force applied between the first and second pressure applying rollers varies less than 2% over the range of arcuate movement.

30. A pressure applicator assembly cartridge for mounting to a frame of a master processing apparatus comprising:
a cartridge frame configured to removably mount to the frame of a master processing apparatus
a first pressure applying roller;
a second pressure applying roller, the pressure applying rollers being rotatable about parallel roller axes;
a plurality of gears rotatable about respective gear axes parallel to the roller axes, the plurality of gears comprising:
(a) an input gear for receiving input torque,
(b) a first roller gear coaxial with and connected to the first pressure applying roller, and (c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller;
the plurality of gears further comprising a second roller gear coaxial with and connected to the second pressure applying roller, the plurality of gears being intermeshed for simultaneous counter-rotation of both the first and second pressure applying rollers the input gear being coaxial with and connected to the second roller gear and the second pressure applying roller;
a handle configured to receive an input force to cause a pivoting of the pivot plate; and
a spring lock within the handle;
wherein the spring lock is configured to selectively hold the handle in a first locked position, causing the first pressure applying roller to be held in a first spacing from the second pressure applying roller.

31. A cartridge according to claim 30, wherein:
the spring lock is also configured to selectively hold the handle in a second locked position, causing the first pressure applying roller to be pressed against the second pressure applying roller.

32. A cartridge according to claim 31, further comprising:
at least one compression spring, configured to compress along an axis generally perpendicular to the axis of the second pressure applying roller, supporting the second pressure applying roller;
wherein causing the first pressure applying roller to be pressed against the second pressure applying roller causes a compression of the at least one compression spring.

33. A pressure applicator assembly cartridge for mounting to a frame of a master processing apparatus comprising:
a cartridge frame configured to removably mount to the frame of a master processing apparatus
a first pressure applying roller;
a second pressure applying roller, the pressure applying rollers being rotatable about parallel roller axes;
a plurality of gears rotatable about respective gear axes parallel to the roller axes, the plurality of gears comprising:
(a) an input gear for receiving input torque,
(b) a first roller gear coaxial with and connected to the first pressure applying roller, and
(c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller;
a cutting guide member, affixed parallel to the first pressure applying roller, and configured to move with the first pressure applying roller through the range of arcuate movement;
a cutting blade, configured to run along the cutting guide member to cut materials fed therein,
wherein the cutting blade is detachable from the cutting guide member.

34. A cartridge according to claim 33, wherein the cutting guide member is further configured to pivot radially around the first pressure applying roller.

35. A cartridge according to claim 34, wherein the cutting guide member locks in a raised position alongside the first pressure applying roller when the first pressure applying roller is at a maximum separation from the second pressure applying roller.

36. A cartridge according to claim 33, further comprising a cutting surface parallel to and below the cutting guide member on a horizontal plane with the second pressure applying roller.

37. A master processing apparatus comprising:
an apparatus frame;
a cartridge, configured to removably mount to the apparatus frame, comprising:
a cartridge frame;
a first pressure applying roller;
a second pressure applying roller, the pressure applying rollers being rotatable about parallel roller axes;
a plurality of gears rotatable about respective gear axes parallel to the roller axes, the plurality of gears comprising:
(a) an input gear for receiving input torque,
(b) a first roller gear coaxial with and connected to the first pressure applying roller, and
(c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
a spring about the pivot plate gear axis for biasing the pivot plate and first pressure applying roller towards the second pressure applying roller,
wherein the plurality of gears further comprises a second roller gear coaxial with and connected to the second pressure applying roller, the plurality of gears being intermeshed for simultaneous counter-rotation of both the first and second pressure applying rollers.

38. A master processing apparatus according to claim 37, wherein a spring constant and configuration of the spring is such that the force applied between the first and second pressure applying rollers varies less than 18% over the range of arcuate movement.

39. A master processing apparatus according to claim 38, wherein the spring constant and configuration of the spring is such that the force applied between the first and second pressure applying rollers varies less than 12% over the range of arcuate movement.

40. A master processing apparatus according to claim 39, wherein the spring constant and configuration of the spring is such that the force applied between the first and second pressure applying rollers varies less than 8% over the range of arcuate movement.

41. A master processing apparatus according to claim 40, wherein the spring constant and configuration of the spring is such that the force applied between the first and second pressure applying rollers varies less than 4% over the range of arcuate movement.

42. A master processing apparatus according to claim 41, wherein the spring constant and configuration of the spring is such that the force applied between the first and second pressure applying rollers varies less than 2% over the range of arcuate movement.

43. A master processing apparatus according to claim 37, wherein the plurality of gears further comprises an intermediate pivot plate gear rotatably mounted to the pivot plate gear, for rotation about an axis spaced radially from the axes of the pivot plate gear and the first roller gear and intermeshed with both the first roller gear and the pivot plate gear for transferring the input torque from the pivot plate gear to the first roller gear.

44. A master processing apparatus according to claim 37, wherein the input gear is coaxial with and connected to the second roller gear and the second pressure applying roller.

45. A master processing apparatus according to claim 37, wherein the cartridge further comprises a handle configured to receive an input force to cause a pivoting of the pivot plate.

46. A master processing apparatus according to claim 37, wherein the cartridge further comprises:
   a plurality of mirror gears rotatable about respective mirror gear axes parallel to the roller axes, the plurality of mirror gears comprising:
      (a) a mirror first roller gear coaxial with and connected to the first pressure applying roller, at an opposite end of the first pressure applying roller, and
      (b) a mirror second roller gear coaxial with and connected to the second pressure applying roller, at an opposite end of the second pressure applying roller, receiving the input torque from the second pressure applying roller;
      (c) a mirror pivot plate gear for transferring the input torque from the mirror second roller gear to the mirror first roller gear;
   a mirror pivot plate mounted for pivotal movement about the axis of the mirror pivot plate gear; and
   the mirror first roller gear and the first pressure applying roller being connected to the mirror pivot plate with their axes spaced radially from the axis of the mirror pivot plate gear to permit the range of arcuate movement for the first pressure applying roller for adjusting the spacing between the first and second pressure applying rollers, the plurality of mirror gears being configured to remain intermeshed throughout the range of arcuate movement for the first pressure applying roller.

47. A master processing apparatus comprising:
   an apparatus frame;
   a cartridge, configured to removably mount to the apparatus frame, comprising:
      a cartridge frame;
      a first pressure applying roller;
      a second pressure applying roller, the pressure applying rollers being rotatable about parallel roller axes;
      a plurality of gears rotatable about respective gear axes parallel to the roller axes, the plurality of gears comprising:
         (d) an input gear for receiving input torque,
         (e) a first roller gear coaxial with and connected to the first pressure applying roller, and
         (f) a pivot plate gear for transferring the input torque from the input gear to the first roller gear;
      a pivot plate mounted for pivotal movement about the axis of the pivot plate gear;
      the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and
      a spring about the pivot plate gear axis for biasing the pivot plate and first pressure applying roller towards the second pressure applying roller;
   wherein the cartridge further comprises a handle configured to receive an input force to cause a pivoting of the pivot plate; and
   wherein the cartridge further comprises:
      a spring lock within the handle; and
   wherein the spring lock is configured to selectively hold the handle in a first locked position, causing the first pressure applying roller to be held in a first spacing from the second pressure applying roller.

48. A master processing apparatus according to claim 47, wherein: the spring lock is also configured to selectively hold the handle in a second locked position, causing the first pressure applying roller to be pressed against the second pressure applying roller.

49. A master processing apparatus according to claim 48, wherein the cartridge further comprises:
   at least one compression spring, configured to compress along an axis generally perpendicular to the axis of the second pressure applying roller, supporting the second pressure applying roller;
   wherein causing the first pressure applying roller to be pressed against the second pressure applying roller causes a compression of the at least one compression spring.

50. A master processing apparatus comprising:
   an apparatus frame;
   a cartridge, configured to removably mount to the apparatus frame, comprising:
      a cartridge frame;
      a first pressure applying roller;
      a second pressure applying roller, the pressure applying rollers being rotatable about parallel roller axes;
      a plurality of gears rotatable about respective gear axes parallel to the roller axes, the plurality of gears comprising:
         (a) an input gear for receiving input torque,
         (b) a first roller gear coaxial with and connected to the first pressure applying roller, and
         (c) a pivot plate gear for transferring the input torque from the input gear to the first roller gear;
      a pivot plate mounted for pivotal movement about the axis of the pivot plate gear;

the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and a spring about the pivot plate gear axis for biasing the pivot plate and first pressure applying roller towards the second pressure applying roller, wherein the spring is a torsion spring.

51. A master processing apparatus comprising:

an apparatus frame;

a cartridge, configured to removably mount to the apparatus frame, comprising:
   a cartridge frame;
   a first pressure applying roller;
   a second pressure applying roller, the pressure applying rollers being rotatable about parallel roller axes;
   a plurality of gears rotatable about respective gear axes parallel to the roller axes, the plurality of gears comprising:
     (a) an input gear for receiving input torque,
     (b) a first roller gear coaxial with and connected to the first pressure applying roller, and
     (c) a pivot plate gear for transferring the input torque from the input gear to the first roller gear;
a pivot plate mounted for pivotal movement about the axis of the pivot plate gear;
the first roller gear and the first pressure applying roller being connected to the pivot plate with their axes spaced radially from the axis of the pivot plate gear to permit a range of arcuate movement for the first pressure applying roller for adjusting a spacing between the first and second pressure applying rollers, the plurality of gears being configured to remain intermeshed throughout the range of arcuate movement for the first pressure applying roller; and a spring about the pivot plate gear axis for biasing the pivot plate and first pressure applying roller towards the second pressure applying roller;

a cutting guide member, affixed parallel to the first pressure applying roller, and configured to move with the first pressure applying roller through the range of arcuate movement;

a cutting blade, configured to run along the cutting guide member to cut materials fed therein;

wherein the cutting blade is detachable from the cutting guide member.

52. A master processing apparatus according to claim 51, wherein the cutting guide member is further configured to pivot radially around the first pressure applying roller.

53. A master processing apparatus according to claim 52, wherein the cutting guide member locks in a raised position alongside the first pressure applying roller when the first pressure applying roller is at a maximum separation from the second pressure applying roller.

54. A master processing apparatus according to claim 51, wherein the cartridge further comprises: a cutting surface parallel to and below the cutting guide member on a horizontal plane with the second pressure applying roller.

* * * * *

UNITED STATES PATENT AND TRADEMARK OFFICE
CERTIFICATE OF CORRECTION

PATENT NO. : 8,960,415 B2
APPLICATION NO. : 13/158216
DATED : February 24, 2015
INVENTOR(S) : Deborah Lynn Simonsen et al.

It is certified that error appears in the above-identified patent and that said Letters Patent is hereby corrected as shown below:

In the Claims

Claim 26, Column 14, lines 35-39, should be deleted and insert therefor:
--A cartridge according to claim 25, wherein the spring constant and configuration of the torsion spring is such that the force applied between the first and second pressure applying rollers varies less than 12% over the range of arcuate movement.--

Claim 27, Column 14, lines 40-44, should be deleted and insert therefor:
--A cartridge according to claim 26, wherein the spring constant and configuration of the torsion spring is such that the force applied between the first and second pressure applying rollers varies less than 8% over the range of arcuate movement.--

Claim 28, Column 14, lines 45-49, should be deleted and insert therefor:
--A cartridge according to claim 27, wherein the spring constant and configuration of the torsion spring is such that the force applied between the first and second pressure applying rollers varies less than 4% over the range of arcuate movement.--

Claim 29, Column 14, lines 50-54, should be deleted and insert therefor:
--A cartridge according to claim 28, wherein the spring constant and configuration of the torsion spring is such that the force applied between the first and second pressure applying rollers varies less than 2% over the range of arcuate movement.--

Signed and Sealed this
Twenty-third Day of June, 2015

Michelle K. Lee
*Director of the United States Patent and Trademark Office*